United States Patent [19]

Chalaire

[11] Patent Number: 4,655,248
[45] Date of Patent: Apr. 7, 1987

[54] CHECK VALVE

[75] Inventor: Donald K. Chalaire, Palm Beach Gardens, Fla.

[73] Assignee: United Technologies Corporation, Hartford, Conn.

[21] Appl. No.: 809,368

[22] Filed: Dec. 16, 1985

[51] Int. Cl.[4] ............................................. F16K 15/02
[52] U.S. Cl. ................... 137/528; 137/515.7; 137/533.17
[58] Field of Search ............... 137/515.7, 517, 519, 137/528, 533.17, 543.21

[56] References Cited

U.S. PATENT DOCUMENTS

| | | | |
|---|---|---|---|
| 1,628,441 | 5/1927 | Soresi | 137/519 X |
| 1,873,782 | 8/1932 | Nixon | 137/533.17 X |
| 1,897,572 | 2/1933 | Cornell | 137/533.17 X |
| 2,021,351 | 11/1935 | Carson . | |
| 2,320,913 | 6/1943 | Crowell . | |
| 2,748,798 | 6/1956 | Withrow | 137/533.17 X |
| 2,755,816 | 7/1956 | Collins | 137/533.17 X |
| 3,036,594 | 5/1962 | Salisbury . | |
| 3,229,864 | 1/1966 | Roder . | |
| 4,414,997 | 11/1983 | Jacobson | 137/533.17 X |

FOREIGN PATENT DOCUMENTS 1028500  4/1958  Fed. Rep. of Germany ...... 137/519

Primary Examiner—Robert G. Nilson
Attorney, Agent, or Firm—Troxell K. Snyder

[57] ABSTRACT

A check valve (22) is provided with a tapered plug (32), freely longitudinally movable with respect to a valve seat surface (34) disposed about the opening of the inlet passage (24). A plurality of cutouts (36) are disposed about the outer edge of the plug (32) for passing the forward flowing fluid. An exit nozzle (38) directs reverse flowing fluid against the rear of the plug (32), assisting valve closure.

8 Claims, 2 Drawing Figures

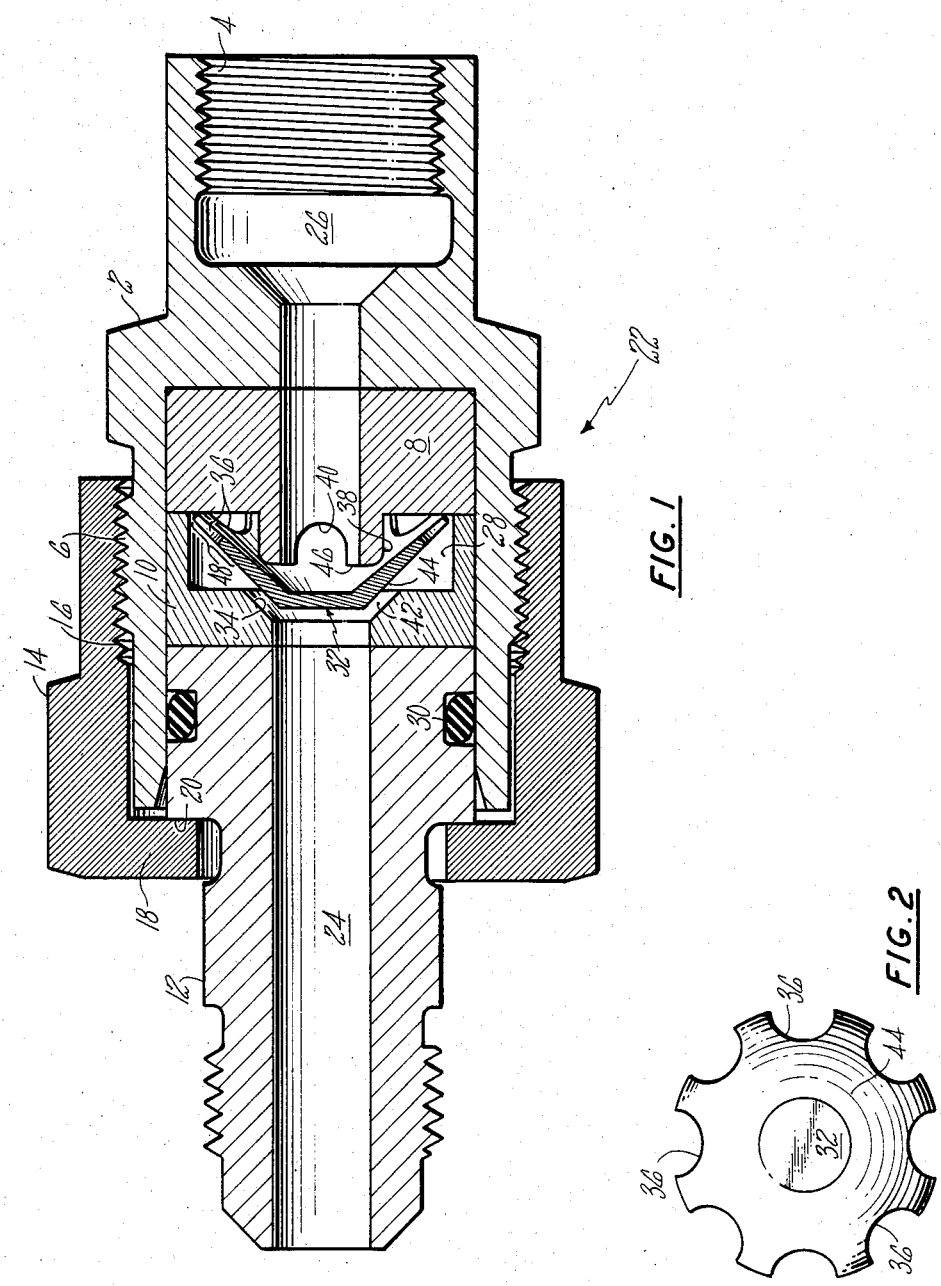

CHECK VALVE

The Government has rights in this invention pursuant to Contract No. F33657-84-C-2122.

TECHNICAL FIELD

The present invention relates to a check valve for regulating the flow of a reversing fluid stream, and more particularly, to a check valve having a movable internal member for preferentially opening and closing the valve in response to the direction of fluid flow therethrough.

BACKGROUND

The use and construction of fluidic check valves for rendering unidirectional the otherwise reversing flows of liquid or gas streams is well known in the art of practical fluid mechanics. Such valves are in use today in a wide variety of fluid systems and environments, being embodied in a number of mechanical configurations linked by a single functional chore, the prohibition of fluid flow in an undesired, reverse direction.

One particular application in which commercially available check valves have proved to be unsuitable is in the hydraulic shaft damping system of a high speed gas turbine engine or the like. In such a system, a continuous flow of oil or other damping fluid is introduced into an annular space formed between an outer stationary support cylinder and an inner cylinder or shaft bearing race support which is subject to a transverse orbital movement as a result of some imbalance in the rotating portion of the gas turbine.

The transverse orbital motion of the inner cylinder results in a rotating pressure wave circumnavigating the inner cylinder at a speed equivalent to that of the transverse cylinder oscillation. For those bearing damping systems wherein the flow of damping fluid is introduced at one or more points disposed about the circumference of the annulus, it has been found that the orbiting pressure wave will drive the hydraulic fluid back down the fluid supply line, resulting in interrupted or unsteady flow and possible local cavitation within the annulus.

Attempts to restrict this periodic reverse flow in the supply line by installing commercially available check valves have proved unsatisfactory due to the inability of such prior art valves to perform adequately under the high frequency flow reversals experienced. Experimentation has verified the unsuitability for these prior art valves at oscillation rates of 80 Hz or above, while desired turbine engine operating speeds result in the occurrence of flow reversals at frequencies of 130 Hz or higher. The inability of the commercial industry to supply check valves responsive to the high frequency environment discussed hereinabove has resulted in undesirable limitations being imposed gas turbine start-up times and power levels in order to avoid inadequately damped, and hence possibly damaging, operation.

DISCLOSURE OF INVENTION

The present invention provides a quick-response check valve for preventing reverse direction flow of a liquid or a gas stream. The check valve according to the present invention provides the additional features of having a low pressure drop in the forward fluid flow direction, is self-cleaning and tolerant of the presence of solid impurities in the flowing fluid stream, and is configured so as to "fail open" in the event of an overpressure or internal jammed situation.

According to the preferred embodiment of the present invention, a valve body is provided having collinear inlet and outlet passages for respectively accepting and discharging the forward flowing fluid stream. A valve cavity, within the valve body encloses and retains a hollow, conical plug. The plug is free to move longitudinally within the cavity under the influence of the flowing fluid stream, being displaced toward the outlet passage during periods of fluid flow in the forward direction, and being displaced toward the inlet passage during periods of attempted reverse fluid flow.

A valve seat, surrounding the valve inlet passage and having a frusto-conical sealing surface opening downstream into the valve cavity is provided for sealingly engaging the conical plug during such periods of attempted reverse flow. The valve seat is smaller in area as compared to the outer and downstream surfaces of the conical plug, resulting in a relatively small volume of fluid being displaced during the sealing engagement of the seat and the conical plug.

The plug is of sufficient tranverse dimension so as to substantially span the valve cavity, restricting tranverse displacement of the plug therewithin. A plurality of cutouts or flow openings disposed about the outer periphery of the conical plug allows passage of the forward flowing fluid through the cavity and into the outlet passage.

Rapid valve response results from the lightweight construction of the plug as well as the configuration of the valve seat and outer plug surface. During periods of forward fluid flow, hydrodynamic forces cause the conical plug to remain positioned adjacent the inlet passage and valve seat, being displaced therefrom only as necessary to admit the incoming fluid stream. The lack of a spring or any other static, force producing means for urging the plug toward the valve seat reduces the pressure loss experienced by the forward flowing fluid and permits the plug to freely move away from the valve seat so as to pass any solid impurities which may be present in the flowing fluid.

During periods of attempted reverse flow, similar hydrodynamic forces act to urge the conical plug into engagement with the valve seat, with the build-up of static fluid forces against the plug acting to urge and maintain the plug against the valve seat following valve closure. Movement of the plug into engagement of the valve seat is enhanced in the preferred embodiment check valve by an outlet nozzle, extending into the valve cavity to a point proximate the conical plug for inducing the initial reverse flow of fluid to impact the rear of the conical plug and thus provide an additional momentum-derived urging force.

A transverse flow opening present in the exit nozzle allows fluid flow to continue in the forward direction, even if the conical plug should be jammed backward in the valve cavity due to an extreme fluid supply overpressure or unusual force. The check valve according to the preferred embodiment of the present invention thus would continue to permit flow in the desired forward direction following damage sufficient to destroy its reverse flow checking function.

BRIEF DESCRIPTION OF DRAWINGS

FIG. 1 shows a longitudinal cross section of the preferred embodiment according to the present invention; and FIG. 2 shows a view of the upstream side of the conical plug of the preferred embodiment valve.

BEST MODE FOR CARRYING OUT THE INVENTION

Referring generally to FIG. 1, but before beginning a detailed description of the individual elements shown therein, a brief summary of terminology will be presented in order to facilitate the following discussion. It should be appreciated that the use of these terms is not intended to exclude functionally or geometrically similar structure from the scope of this invention but merely to render more succinct the following disclosure of the configuration, elements, and operation of the subject invention. It is therefore to be understood that "forward fluid flow" shall generally mean a flow of fluid in the preferred (i.e., unchecked) direction, and specifically with regard to the cross section as shown in FIG. 1 as being fluid flow from the left to the right.

"Reverse fluid flow" or "attempted reverse fluid flow" shall generally refer to the condition in which fluid, if unchecked, either flows or attempts to flow through the check valve in the undesired direction. With regard to FIG. 1, this shall be specifically in the direction of right to left.

"Longitudinal" shall refer to movement or displacement substantially parallel with the general overall flow direction of fluid through the check valve.

"Transverse" shall mean movement or displacement perpendicular to the above-defined longitudinal direction.

"Outward" shall refer to displacement or movement in the transverse direction away from the median streamline, central axis, or other point of reference in a flow passage or physical element.

"Upstream" and "downstream" shall be determined with reference to the forward flow of fluid as defined hereinabove.

With particular reference to FIG. 1, the check valve according to the present invention is seen as being comprised of a generally cylindrical sleeve member 2 being internally threaded 4 at the downstream end thereof, and externally threaded 6 at the upstream end. Disposed within the sleeve member 2 are spacer block 8, seat member 10, and a portion of packing member 12. Elements 2, 8, 10, and 12 are urged together by a coupling member 14 having an internal thread 16 and a flanged portion 18 for contacting the packing member shoulder 20 as shown.

Elements 2, 8, 10, 12 and 14 collectively comprise a fluid-tight valve body 22, further defining an inlet flow passage 24, an outlet passage 26 and an internal valve cavity 28. Annular packing 30, disposed between packing member 12 and sleeve member 2 secures the valve body assembly 22 from leakage between the internal passages and cavities 24, 26, 28 and the exterior of the valve body 22. Although not shown specifically in FIG. 1, it will be appreciated by those skilled in the valve art that packing member 12 and sleeve member 2 are well adapted to be coupled with other fluid carrying conduits or connections for conducting fluid to and through the valve.

Plug member 32 is shown disposed within the internal valve cavity 28 and being freely movable therewithin. The plug member 32 of the preferred embodiment is shown as having a hollow, conical configuration, and being oriented with an outwardly increasing transverse displacement in the forward fluid flow direction. The plug 32 includes a skirt portion 48 substantially spanning the valve cavity in the transverse direction for restricting transverse movement. The preferred embodiment also includes an annular valve seat 34 disposed around the inlet passage 24 for sealingly engaging a portion of the upstream surface 44 of the plug member 32 as will be described hereinbelow.

The operation of the check valve according to the present invention should now be apparent to even the most casual observer. During periods wherein fluid flow occurs in the forward direction, fluid passes through the inlet passage 24 and enters the internal cavity 28 by passing between the valve seat 34 and the plug member 32. The flow passes around the plug member 32 and into the outlet passage 26 via the plurality of circumferential flow cutouts 36 in the outer circumference of the plug member 32 as shown in FIG. 2. Although shown as being of easily machinable semi-circular configuration, cutouts 36 may equivalently be of rectangular, triangular or other shape sufficient to pass the forward flowing fluid. Such flow cutouts need not be disposed at the periphery of the plug skirt 48, but may equivalently be disposed wholly within the plug 32.

During periods of attempted reverse flow, it should also be apparent tht the initial movement of the fluid from the outlet passage 26 into the internal cavity 28 displaces the plug 32 longitudinally against the valve seat 34, closing the check valve and thus preventing further reverse fluid flow.

Plug member 32 is displaced longitudinally within the valve cavity 28 under the sole influence of the flowing fluid. The absence of a closing spring or other structure for independently urging the plug 32 into sealing engagement with the valve seat 34 reduces the fluidic resistance of the subject check valve and further permits the plug 32 to be freely displaced by solid impurities, debris or other material entrained in the forward flowing fluid. The enhanced debris passing capability of the check valve according to the present invention is a significant advantage over the prior art check valves which may become jammed or blocked by the accumulation of such material.

Further discussion of the hydrodynamic forces acting on the plug member 32 is necessary to clearly set forth the rapid response achieved by the pictured configuration. During periods of forward flow, fluid passing from the inlet passage 24 into the valve cavity 28 will be accelerated while passing through the annular throat 42 formed between the valve seat 34 and the upstream surface 44 of the plug member 32. Upon entering the valve cavity 28, a forward flowing fluid experiences a deceleration due to the increased available flow area and remains at this reduced velocity while flowing through cutouts 36 and into the outlet passage 26. As is well known in the science of fluid mechanics, the localized region of higher velocity fluid flow induced in the annular space between the valve seat 34 and the upstream surface of the plug 32 results in a localized region of reduced static fluid pressure. Plug member 32 being unrestrained in the longitudinal direction within the valve cavity 28 is thus free to move toward the valve seat 34 under the influence of the rsulting static fluid pressure imbalance.

It will, of course, be appreciated that the plug member 32 will not move into contact with the seal surface 34 as long as forward fluid flow continues, but will, in essence, float at the point where the static fluid pressure imbalance between the upstream and downstream surfaces of the plug are matched by the frictional and momentum pressure drop resulting from the restricted flow area. In short summary, the displacement between the upstream surface of the plug 32 and valve seat 34 will vary in response to the volumetric flow of fluid through the check valve. Upon initiation of reverse or attempted reverse fluid flow through the check valve according to the present invention, this localized area of reduced fluid static force again urges the plug member 32 in the direction of valve seat 34, however, in this situation it is augmented by the frictional fluid resistance across the throat 42 in urging the plug 32 into sealing engagement with the valve seat 34.

It should also be apparent that this valve seat 34 is of relatively small surface area as compared to that of the plug 32, resulting in a reduced volume of fluid being displaced from between the seat 34 and upstream plug surface 44 during the sealing enagement thereof. This reduced volume, as compared to that common in prior art check valves utilizing reeds or other large area sealing members, diminishes the force necessary to rapidly urge the plug 32 into sealing contact with the valve seat 34. This feature, in addition to the lightweight, hollow configuration of the plug 32 itself, improves the responsiveness of the subject check valve to rapid reversals in fluid flow, enabling it to effectively regulate periodic flow reversals at a rate of 130 Hz or higher.

The rapid closing of the check valve according to the present invention is even further enhanced by the addition of an outlet nozzle structure 38 shown as part of the spacer block 8 of the valve body 22 and having a longitudinal flow opening 46. Initial reverse fluid flow from the outlet passage 26 passes through the exit nozzle 38 and is directed against the downstream surface of the plug 32. As is apparent from FIG. 1, such reverse flowing fluid will impinge upon the downstream surface of the plug 32, resulting in a change of fluid momentum and providing a further inducement for the sealing engagement with the valve seat 34 due to the reactive force imposed on the plug 32.

Nozzle 38 is additionally provided with a transverse opening 40 for admitting forward flowing fluid into the outlet passage 26 in the event that the plug 32 should be undesirably jammed downstream by means of the occurrence of an extreme fluid overpressure on the upstream side of the check valve, the impact of a large piece of debris against the upstream surface of the plug 32, or other atypical event which could jam the plug 32 downstream against the outlet nozzle 38. In this event, transverse opening 40 would still permit forward fluid flow into the outlet passage 26, even though the jammed nozzle plug 32, and hence the entire check valve, is no longer functional for preventing reverse fluid flow. This fail-open feature is of particular utility in lubricating or other applications wherein a loss or shutdown of fluid flow is of far greater negative consequence than the attendant loss of the checking function.

It will be appreciated by those skilled in the art that the preferred embodiment as discussed hereinabove has been presented in fulfillment of applicants duty of disclosure of the best mode for practicing the subject invention, and that the appended figures and foregoing descriptions are therefore meant to be interpreted in an illustrative and not a limiting sense. In particular, although specifically described with reference to the preferred embodiment which is essentially symmetric with respect to a central longitudinal axis, it must be understood that the present invention is equivalently addressed to check valves of annular, rectangular or other practical flow cross section.

I claim:

1. A check valve for regulating a high frequency, reversible flowing stream of fluid, comprising:
   a valve body defining an internal cavity and having an inlet passage for admitting the forward flowing fluid stream into the cavity and a outlet passage for conducting the admitted forward flowing stream out of the cavity;
   a tapered plug, disposed within the cavity and defining an upstream surface of increasing outward transverse displacement with respect to the forward fluid flow direction, the plug being freely longitudinally movable under the influence of the flowing fluid stream and including means for conducting the forward flowing fluid therethrough;
   a valve seat, disposed in the housing about the inlet passage for sealingly engaging a portion of the plug surface during periods of attempted reverse fluid flow, the valve seat having a relatively small surface area as compared to the upstream plug surface disposed transversely outward of the sealingly engaged plug surface portion; and
   the valve seat and plug surface portion defining a reduced fluid flow area throat therebetween for locally accelerating the forward flowing fluid relative to the forward flowing fluid velocity downstream of the throat, thereby establishing a static pressure imbalance along the plug for urging the plug toward the valve seat.

2. The check valve as recited in claim 1, wherein the tapered plug substantially transversely spans the internal cavity, and
   the conducting means includes a plurality of cutouts disposed in the outer portion of the tapered plug.

3. The check valve as recited in claim 2, wherein the internal cavity, valve seat and tapered plug each define a circular cross section taken transverse to the forward fluid flow direction, and wherein the cutouts are distributed about the outer circumference of the tapered plug.

4. The check valve as recited in claim 3, wherein the outlet passage is oriented collinearly with respect to the inlet passage.

5. The check valve as recited in claim 3, wherein the valve body further defines an outlet nozzle, extending into the internal cavity and including a longitudinally oriented opening for directing the reverse flowing fluid against the tapered plug.

6. The check valve as recited in claim 5, wherein the outlet nozzle further includes a transversely oriented opening for admitting the forward flowing fluid into the outlet passage.

7. A fluid check valve for prohibiting flow of a fluid in a reverse direction and allowing flow of the fluid in a forward direction, comprising:
   a valve body having a hollow interior, including an inlet passage opening into the interior of the body for admitting the forward flowing fluid, and an outlet passage, collinear with the inlet passage and opening into the valve body interior opposite the inlet passage opening for conducting the admitted forward flowing fluid from the body interior;
   an annular valve seat, disposed about the inlet passage opening and defining a frusto-conical sealing surface of increasing diameter opening into the valve body interior;

a tapered plug disposed and retained within the valve body interior, the plug further being freely longitudinally movable between the inlet passage opening and the outlet passage opening under the infuence of the flowing fluid, the tapered plug further including an upstream surface having a portion sealingly engageable with the valve seat when the tapered plug is urged thereagainst by attempted fluid flow in the reverse direction, and a downstream skirt portion, extending longitudinally downstream and transversely outward from the sealing portion, the skirt portion substantially spanning the valve body interior for restricting transverse displacement of the tapered plug therein, the skirt portion further including a plurality of circumferentially disposed cutouts for allowing the forward flowing fluid to pass by the tapered plug; and wherein the valve seat and the upstream surface sealing portion have a relatively small surface area as compared to the skirt portion and define an annular throat for accelerating the forward flowing fluid passing therethrough and establishing a localized region of reduced static pressure, and wherein, the body hollow interior is sized relative to the tapered plug for decelerating the forward flowing fluid downstream of the annular throat, thereby establishing an imbalance of static fluid pressure over the tapered plug for urging the plug longitudinally upstream.

8. The fluid check valve as recited in claim 7, including an exit nozzle, extending longitudinally into the valve body interior and having both axial and transverse openings for admitting the forward flowing fluid into the exit passage.

* * * * *